(12) United States Patent
Mallipeddi et al.

(10) Patent No.: US 10,394,611 B2
(45) Date of Patent: Aug. 27, 2019

(54) SCALING COMPUTING CLUSTERS IN A DISTRIBUTED COMPUTING SYSTEM

(71) Applicant: Amazon Technologies, Inc., Reno, NV (US)

(72) Inventors: Venkata Harish Mallipeddi, Seattle, WA (US); Aleksandras Surna, Redmond, WA (US)

(73) Assignee: Amazon Technologies, Inc., Reno, NV (US)

( * ) Notice: Subject to any disclaimer, the term of this patent is extended or adjusted under 35 U.S.C. 154(b) by 713 days.

(21) Appl. No.: 13/685,649

(22) Filed: Nov. 26, 2012

(65) Prior Publication Data

US 2014/0149590 A1    May 29, 2014

(51) Int. Cl.
*G06F 9/50* (2006.01)
*H04L 29/08* (2006.01)

(52) U.S. Cl.
CPC .......... *G06F 9/5061* (2013.01); *G06F 9/5088* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 5,835,954 A | 11/1998 | Dyanovich et al. | |
| 6,748,429 B1 | 6/2004 | Talluri et al. | |
| 7,155,466 B2 * | 12/2006 | Rodriguez et al. | 707/694 |
| 7,484,059 B1 | 1/2009 | Ofer et al. | |
| 7,869,373 B2 | 1/2011 | Lundstrom et al. | |
| 8,260,840 B1 * | 9/2012 | Sirota et al. | 709/201 |
| 8,296,267 B2 * | 10/2012 | Cahill | G06F 16/2329 707/661 |
| 2005/0097145 A1 | 5/2005 | Benhase et al. | |
| 2005/0102387 A1 | 5/2005 | Herington | |

(Continued)

FOREIGN PATENT DOCUMENTS

| | | |
|---|---|---|
| CN | 102438041 | 5/2012 |
| JP | 2006-185413 | 7/2006 |
| JP | 2011-210032 | 10/2011 |

OTHER PUBLICATIONS

Dynamic Virtual Clusters in a Grid Site Manager Jeffrey S. Chase, David E. Irwin, Laura E. Grit, Justin D. Moore, and Sara E. Sprenkle, in Proceedings 12th IEEE International Symposium on High Performance Distributed Computing, Jun. 2003 pp. 1-11.

(Continued)

*Primary Examiner* — Younes Naji
(74) *Attorney, Agent, or Firm* — Robert C. Kowert; Meyertons, Hood, Kivlin, Kowert & Goetzel, P.C.

(57) ABSTRACT

A currently operating computing cluster that has multiple nodes storing cluster data may be scaled. A cluster scaling request may be received for the current cluster indicating a change in a number or type of nodes in the current cluster. In response to receiving the cluster scaling request, a new cluster may be created as indicated in the cluster scaling request, a copy of the cluster data from the current cluster to the nodes in the new cluster may be initiated, a network endpoint for the current cluster may be moved to the new cluster, and the current cluster may be disabled. The current cluster may, in some embodiments, respond to read access requests during the copy of the cluster data.

20 Claims, 9 Drawing Sheets

(56) References Cited

U.S. PATENT DOCUMENTS

| | | | |
|---|---|---|---|
| 2006/0242431 A1* | 10/2006 | LeCrone | G06F 21/6218 713/193 |
| 2007/0174660 A1* | 7/2007 | Peddada | 714/4 |
| 2008/0183975 A1 | 7/2008 | Foster et al. | |
| 2009/0006888 A1* | 1/2009 | Bernhard | G06F 11/08 714/6.12 |
| 2009/0228883 A1 | 9/2009 | Gebhart et al. | |
| 2011/0022711 A1 | 1/2011 | Cohn | |
| 2011/0099147 A1 | 4/2011 | McAlister et al. | |
| 2011/0246669 A1 | 10/2011 | Kanada et al. | |
| 2012/0047107 A1* | 2/2012 | Doddavula et al. | 707/620 |
| 2012/0078849 A1* | 3/2012 | Bryant et al. | 707/652 |
| 2012/0271926 A1 | 10/2012 | Shakirzyanov et al. | |
| 2012/0284719 A1* | 11/2012 | Phan et al. | 718/101 |
| 2012/0290878 A1* | 11/2012 | Gladwin et al. | 714/20 |
| 2012/0297056 A1 | 11/2012 | Lee et al. | |
| 2012/0310887 A1* | 12/2012 | Taranov | G06F 11/2028 707/634 |
| 2013/0080827 A1* | 3/2013 | Kaushik | G06F 3/0617 714/6.3 |
| 2013/0332484 A1* | 12/2013 | Gajic | 707/770 |
| 2014/0064104 A1* | 3/2014 | Nataraja | H04L 61/103 370/248 |

OTHER PUBLICATIONS

Moreno, Ismael Solis and Jie Xu. "Energy-Efficiency in Cloud Computing Environments: Towards Energy Savings without Performance Degradation," International Journal of Cloud Applications and Computing (IJCAC) 1 (2011): pp. 1-19.

Bo Li, Jianxin Li, Jinpeng Huai, Tianyu Wo, Qin Li, Liang Zhong, EnaCloud: An Energy-saving Application Live Placement Approach for Cloud Computing Environments, 2009 IEEE International Conference on Cloud Computing, Sep. 2009. pp. 1-8.

International Search Report and Written Opinion from PCT/US13/71783, dated May 8, 2014, Amazon Technologies, pp. 1-15.

Extended European Search Report from Application No. 13857295.3-1257 / 2923271, PCT/US2013071783, dated Mar. 18, 2016, Amazon Technologies, Inc., pp. 1-10.

Japanese Office Action from Patent Application No. 2015-544180, dated Jun. 28, 2016 (English Translation and Japanese Version), pp. 1-5.

Office Action from Chinese Application No. 201380061473.6, dated Dec. 7, 2016 (English translation and Chinese version, Amazon Technologies, Inc., pp. 1-22.

Examination Report No. 2 from Australian Application No. 2013347807, dated Feb. 9, 2017, Amazon Technologies Inc., pp. 1-4.

Office Action from Japanese Patent Application No. 2015-544180, dated Mar. 14, 2017 (English translation and Japanese version), Amazon Technologies, Inc., Pages.

Office Action from Australian Application No. 2013347807, dated Apr. 28, 2017, Amazon Technologies, Inc., pp. 1-5.

Office Action from Canadian Application No. 2,892,889, dated Aug. 17, 2018, (Amazon Technologies, Inc.), pp. 1-8.

* cited by examiner

SCALING COMPUTING CLUSTERS IN A DISTRIBUTED COMPUTING SYSTEM

BACKGROUND

Cluster-based computing solutions have become pervasive in providing all kinds of services, in part because computing clusters provide a cost-effective means to achieve greater processing power and reliability over single computers with comparable capabilities. Designing cluster-based computing solutions at the appropriate scale for a particular computing task using different numbers or types (e.g., functions, storage capacities, etc.) of computing nodes allows a cluster operator to efficiently allocate computing resources for the task. However, some computing tasks have fluctuating or limited duration resource requirements. For example, certain web-based services may only be utilized heavily during a certain time of the day, and during the remaining time, the computing resources may be underutilized. In such cases, cluster-based computing solutions can be designed with computing resources sufficient to accommodate the maximum resource requirements of the computing task. This solution, however, reduces the efficiency of the resource allocation, and thus the cost-effectiveness. Alternatively, the cluster computing solution may be scaled to maintain the efficient utilization of computing resources for the computing task. Scaling computing clusters, is not without its own difficulties, such as transferring data and service downtime, which also reduce the cost-effectiveness of cluster computing solutions.

Figure 1:
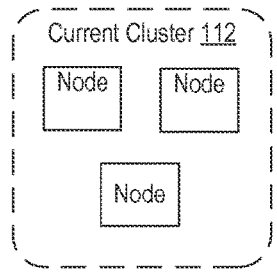
FIG. 1 illustrates a timeline of scaling a computing cluster in a distributed computing system, according to some embodiments.
Figure 1:
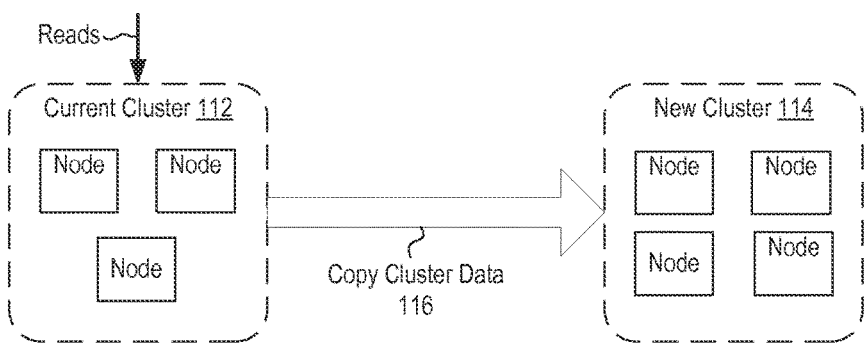
Figure 1:
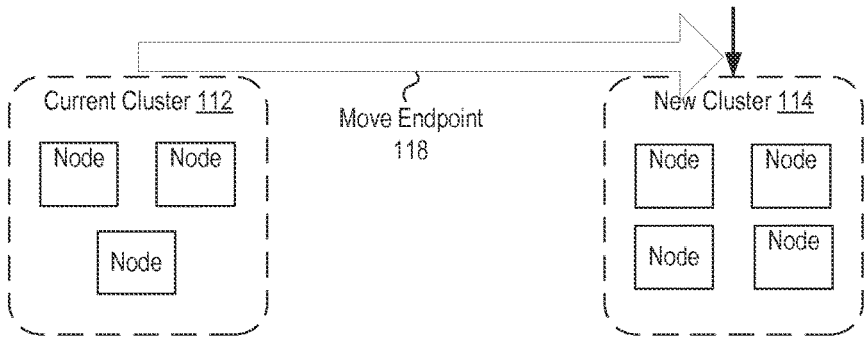
Figure 1:
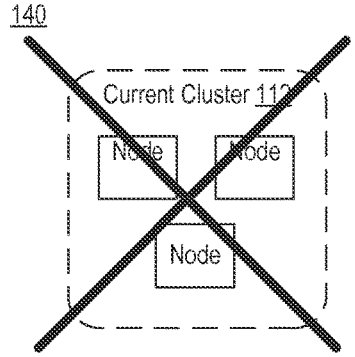
Figure 1:
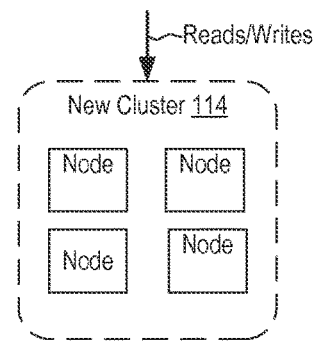

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Various embodiments of scaling computing clusters in a distributed system are described herein. A user of a computing cluster with multiple nodes for storing cluster data and processing access requests for cluster data may determine that a different cluster configuration may better suit the tasks performed by the computing cluster. For example, if the nodes of the computing cluster are overburdened or underutilized, different numbers of nodes or different types of nodes may be added or removed to increase the efficiency of the computing cluster. The user may wish to make these changes and scale the computer cluster to the appropriately efficient configuration. Typically, scaling a computing cluster may involve complex data transfers, networking changes, and in some cases, costly equipment purchases. Instead, in some embodiments the user may send a cluster scaling request to a cluster control interface which may then carry out scaling the computing cluster according to a requested configuration. In at least some embodiments, the computing cluster may be hosted by a network-based cluster hosting service which may implement and perform the various systems and techniques to scale computing clusters in a distributed computing system, as discussed below.

Generally, computing clusters may be implemented by a distributed computing system, grouping one more nodes to work together to accomplish a variety of computing tasks. Computing nodes (also referred to as "nodes") may be implemented on a computing device, such as computing system 1000 described below with regard to FIG. 7. Although a single node may be implemented on a single computing device, nodes are not limited as such. For example, multiple nodes may be implemented on different logical (e.g., virtual) machines on a single computing device. Similarly, a computing device may implement different hardware configurations, for example multiple processors, each of which may be configured to implement a computing node.

The nodes of a cluster may perform various tasks individually, such as in a sequence or order, or together or simultaneously, such as in parallel. In addition to performing these various tasks, nodes may also store or have access to data storage devices. Typically, each node may access only a certain portion of cluster data, such as by having access to only a specific set of storage devices, such as discs—although not all clusters are not limited to such a configuration. A common communication infrastructure, such as a private network, may facilitate communication between the nodes of a cluster, often through exchanging messages. Messages and/or other communication formats may be used to share data among the nodes of a computing cluster. The configuration of a computing cluster may include the number of nodes in the cluster or the types of nodes (e.g., computing capacity of nodes, processing capacity of nodes, particular software or hardware configurations, such as operating systems) in the cluster. Note, that as computing nodes in computing clusters are well-known to those of ordinary skill in the art, the above discussion is not intended to be limiting.

In some embodiments, a cluster control interface for a computing cluster may be provided, allowing a user, operator, owner, manager or other party with permission to control the computing cluster to scale the computing cluster, such as by changing the number or type of nodes in the computing cluster, or perform other cluster control operations. The cluster control interface may receive a cluster scaling request from a user. The cluster scaling request may indicate a change in the number or type of nodes in a currently operating cluster. For example, if the current cluster operates two nodes, then the cluster scale request may indicate a change to operate five nodes. In response to receiving the cluster scaling request, the control interface may create a new cluster that has the number and/or type of nodes indicated in the request message. The cluster control interface may then initiate a copy of cluster data stored in the current cluster being scaled. The copy operation may be performed by the new and current clusters which may send cluster data directly from a node in the current cluster to a node in the new cluster. Each of the nodes in the current and new cluster may send and receive cluster data in parallel. In some embodiments, while the copy is being performed, the current cluster may continue to respond to access requests that seek to read cluster data from the current cluster. However, in at least some embodiments, the current cluster may be placed in read-only mode by the cluster control interface, responding to write access requests with an error. The control cluster may then move a network endpoint that receives access requests from the current cluster to the new cluster. In at least some embodiments, the cluster control interface may then disable or terminate the operation of the current cluster.

Figure 2:
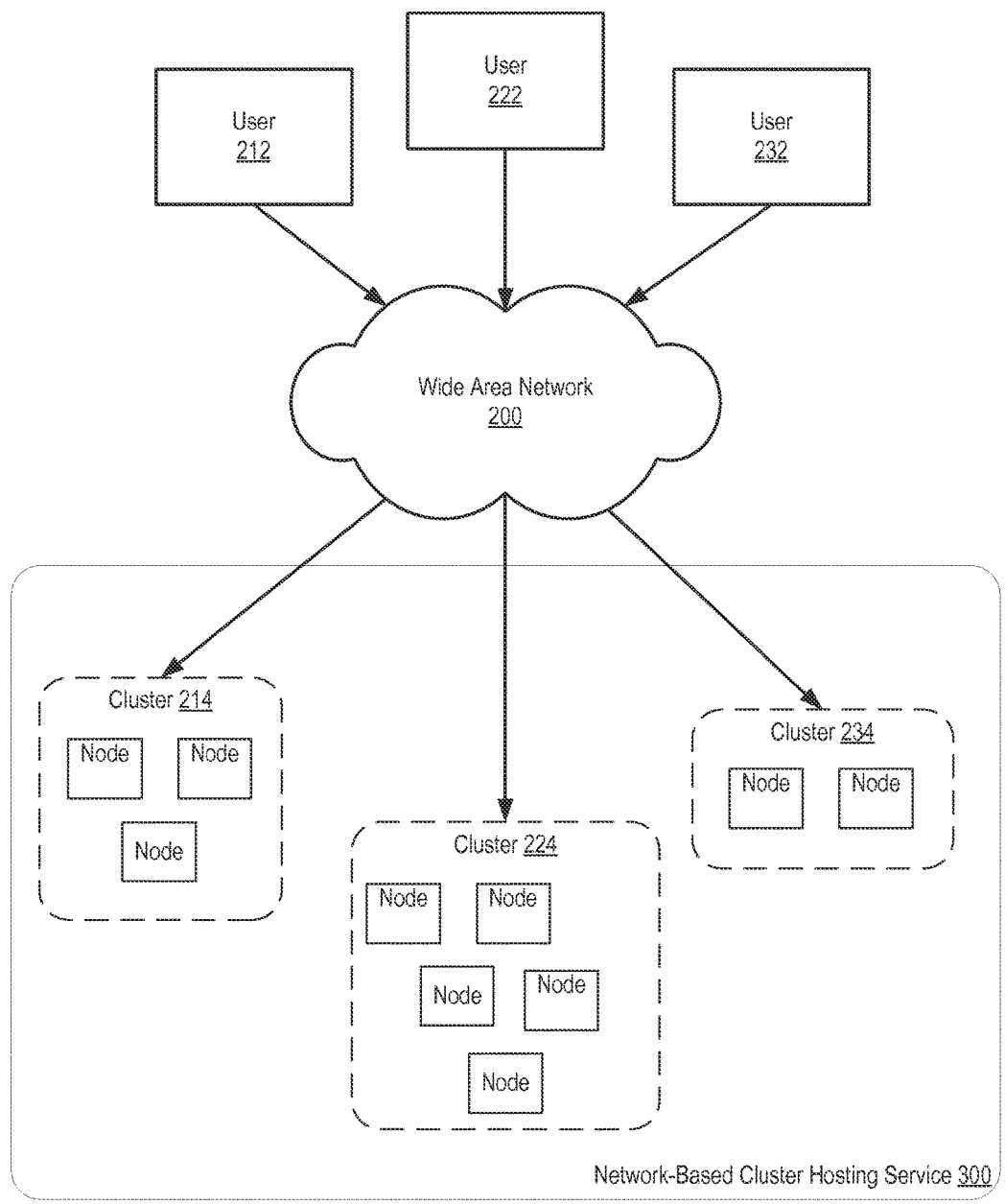
FIG. 2 is a block diagram illustrating an example operating environment for computing clusters, according to some embodiments.
Figure 3:
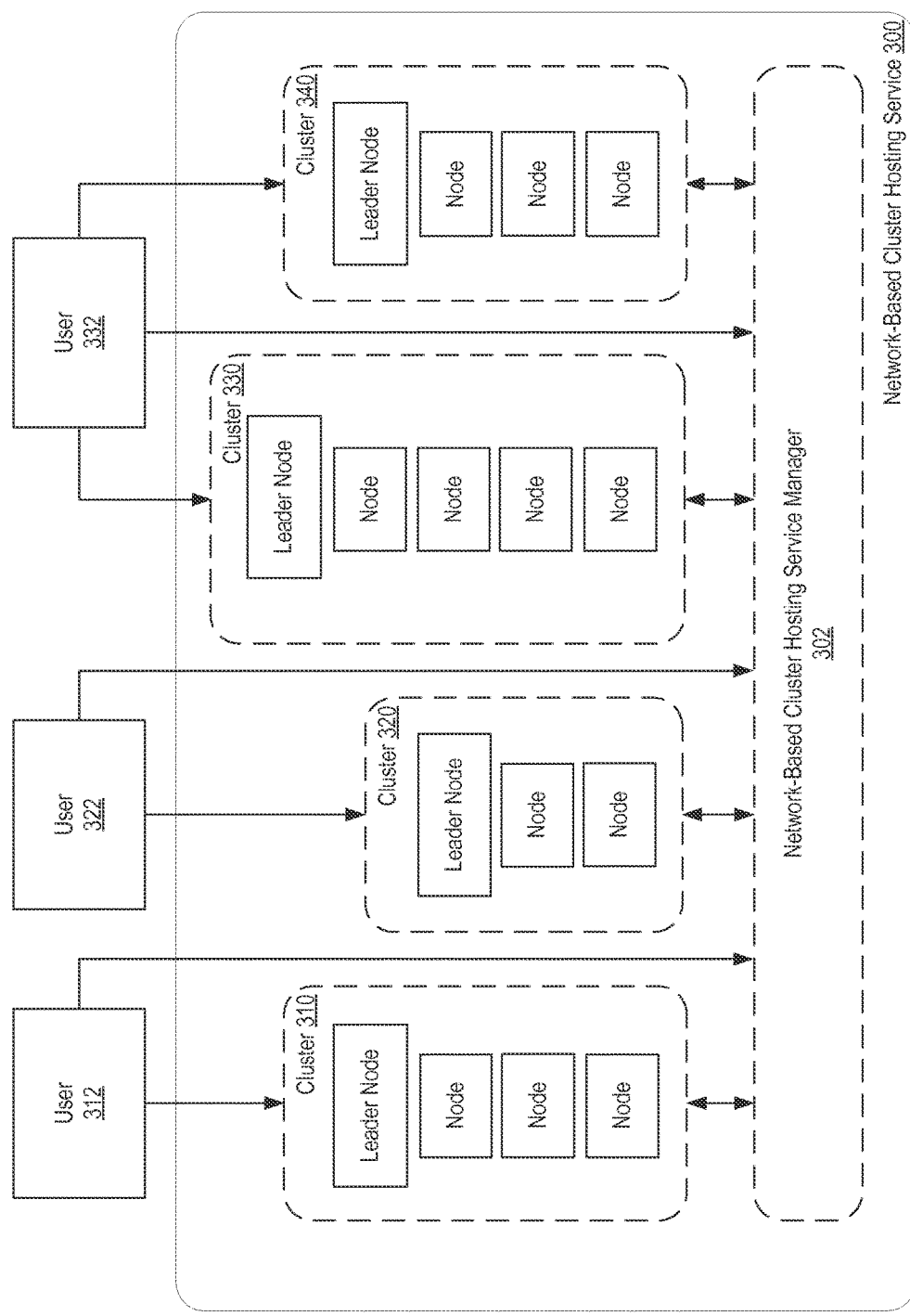
FIG. 3 is a block diagram illustrating an example network-based cluster hosting service, according to some embodiments.

In at least some embodiments, a network-based cluster hosting service, such as the network-based cluster hosting service described below with regard to FIGS. 2 and 3, may implement scaling data clusters in a distributed computing environment. The network-based cluster hosting service may allow users to create, manage, modify, or terminate computing clusters. These computing clusters may be made up of virtual compute nodes, such as nodes implemented on logical/virtual machines hosted by the network-based cluster hosting service. Users may manage the computing clusters hosted on the network-based cluster hosting service to provide computational services for user systems or devices.

For example, in some embodiments, the network-based cluster hosting service may implement a web service that makes it quick, easy, and cost-effective for users (e.g., subscribers) to set up, operate, and scale a data warehouse in a cloud computing environment. The computing clusters hosted by the web service may provide an enterprise-class database query and management system that allows users to scale the clusters, such as by sending a cluster scaling request to a cluster control interface implemented by the web-service. Scaling clusters may allow users of the web service to perform their data warehouse functions, such as fast querying capabilities over structured data, integration with various data loading and ETL (extract, transform, and load) tools, client connections with best-in-class business intelligence (BI) reporting, data mining, and analytics tools, and optimizations for very fast execution of complex analytic queries such as those including multi-table joins, subqueries, and aggregation, more efficiently.

Various embodiments of scaling computer clusters in a distributed computing system may be implemented. FIG. 1 illustrates a timeline of scaling a computing cluster in a distributed computing system, according to some embodiments. At the first stage 110, current cluster 112 is illustrated as having three nodes currently processing access requests and other tasks/operations on cluster data stored in the nodes of current cluster 112. A cluster scaling event is detected, (e.g., such as one or more nodes falling above or below certain utilization thresholds, receiving a cluster scaling request, etc.). A change in the nodes of the current cluster 112 based on the detected event is determined (e.g., underutilization of resources may indicate removing nodes, a cluster scaling request may indicate a change to one or more different types of nodes). As illustrated at 120, a new cluster 114 is created. The new cluster 114 may be created according to the determined change, such as to remove or add a number of nodes. As illustrated in FIG. 1, the determined change was to increase the nodes of the new cluster 114 to four nodes.

The cluster data stored in current cluster 112 is copied, as indicated at 116, from current cluster 112 to new cluster 114. Various methods and techniques for performing the copy are discussed below with regard to FIGS. 5 to 6C. In some embodiments, for example, cluster data at storage locations, such as data slices, in current cluster 112, is assigned according to an assignment schema, which may ensure even distribution of the copying workload among the nodes in the old and the new cluster, and sent to the nodes of new cluster 114. While the copy operation is being performed, current cluster 112 may still perform read access requests. Upon completion of the copy operation, as illustrated at 130, the network endpoint for the current cluster 112 is moved, as indicated at 118, to the new cluster 114. The movement of the network endpoint is such that from the perspective of the user, access requests, sent before and after the movement of the network endpoint, are sent to the same network address. Then new cluster 114 may perform read and write access requests on cluster data stored in the new cluster 114, as illustrated at 140. In some embodiments, the current cluster 112 may be terminated.

Computing Cluster Operating Environments

As discussed above, computing clusters may receive access and other requests from multiple users. Computing clusters may respond to these requests or push messages or data out to multiple users. FIG. 2 illustrates an example operating environment for computing clusters, according to some embodiments. In this illustration, one or more users, such as users 212, 222, and 232, may communicate with one or more clusters, such as clusters 214, 224, and 234, hosted by a network-based cluster hosting service 300 using a variety of different communication methods, such as over Wide Area Network (WAN) 200 (e.g., the Internet). Private networks, intranets, and other forms of communication networks may also facilitate communication between users and computing clusters.

A user, such as users 212, 222, and 232, may communicate with a cluster via a desktop computer, laptop computer, tablet computer, personal digital assistant, mobile device, server, or any other computing system or other device, such as computer system 1000 described below with regard to FIG. 7, configured to send requests to one or more computing clusters, such as clusters 214, 224, and 234, and/or receive responses from one or more computing clusters, such as clusters 214, 224, and 234. Requests, for example may be formatted as a message that includes parameters and/or data associated with a particular function or service offered by a computing cluster. Such a message may be formatted according to a particular markup language such as Extensible Markup Language (XML), and/or may be encapsulated using a protocol such as Simple Object Access Protocol (SOAP). Application programmer interfaces (APIs) may be implemented to provide standardized message formats for users, such as for when users are communicating with network-based cluster hosting service 300.

A user may assemble a message including the request and convey the message to a network endpoint (e.g., a Uniform Resource Locator (URL)) corresponding to the cluster). For example, a user 212 may communicate via a desktop computer running a local software application, such as a web-client, that is configured to send hypertext transfer protocol (HTTP) requests to cluster 214 over WAN 200. Response or other data sent to users may be formatted in similar ways. User 222, for instance, may communicate via a mobile device that receives push data messages from cluster 234 over WAN 200 formatted using XML. A user may also communicate via a component or module of another larger system. For instance, a web-based software-as-a-service (SaaS) system may have a component supporting the web-based service that communicates with one or more clusters over WAN 200.

In at least some embodiments, a network-based cluster hosting service, as indicated at 300, may host clusters, such as clusters 214, 224, and 234. The network-based cluster hosting service may provide network endpoints to the users of the clusters which allow the clusters to send requests and other messages directly to a particular cluster. As noted above, network endpoints, for example may be a particular network address, such as a URL, which points to a particular cluster. For example, user 232 may be given the network endpoint "http://mycluster.com" to send various request messages to. Multiple users may be given a network endpoint for a particular cluster. Various security features may be implemented to prevent unauthorized users from accessing the clusters. Conversely, a single user may be given network endpoints for multiple clusters.

Clusters, as discussed above may be made up of one or more nodes. As illustrated in FIG. 2, these clusters may include different numbers of nodes, such as the three nodes illustrated in cluster 214, the five nodes illustrated in cluster 224, and the two nodes illustrated in cluster 234. In some embodiments, nodes may implement one or more data slices for storing cluster data. These data slices may be part of storage devices, such as the disk storage devices discussed below with regard to FIG. 4. Clusters may be configured to receive requests and other communications over WAN 200 from users. A cluster may be configured to receive requests from multiple users via the network endpoint of the cluster. Although not illustrated in this Figure (see FIGS. 6A to 6C below for more examples), nodes in a cluster may be configured to communicate with nodes of other clusters, such as when performing a copy operation in response to the detection of a cluster scaling event, like a cluster scaling request message.

As noted earlier, various embodiments of scaling computing clusters in distributed computing system may be implemented by a network-based cluster hosting service. FIG. 3 is a block diagram illustrating an example network-based cluster hosting service, according to some embodiments. Network-based cluster hosting service 300 may include a network-based cluster hosting service manager 302 which communicates with the various clusters hosted by the network-based cluster hosting service 300, such as clusters 310, 320, 330, and 340. Users, such as user 312, 322, and 332, may communicate with the network-based cluster hosting service manager 302 and directly with the clusters.

A network-based cluster hosting service 300 may provide users (e.g., subscribers) with cluster computing resources that may be created, configured, managed, scaled, and terminated in response to requests from the user. For example, in some embodiments, network-based cluster hosting service 300 may provide users of the service with clusters composed of virtual compute nodes. These virtual compute nodes may be nodes implemented by virtual machines, such as hardware virtual machines, or other forms of software implemented to simulate hardware configurations. Virtual nodes may be configured to perform the same tasks, functions, and/or services as nodes implemented on physical hardware.

In some embodiments, network-based cluster hosting service 300 may provide cluster hosting services on per usage or per subscription fee basis. A history of the various clusters used by a user may be stored, and used to calculate a usage fee. In at least some embodiments, this usage history may also be used to restore or regenerate a previously used cluster for a user.

A network-based cluster hosting service 300 may be implemented by a large collection of computing devices, such as customized or off-the-shelf computing systems, servers, or any other combination of computing systems or devices, such as the various types of devices described below with regard to FIG. 7. Different subsets of these computing devices may be controlled by different network-based cluster hosting service managers 302. A network-based cluster hosting service manager 302, for example, may provide a cluster control interface to users, such as users 312, 322, and 332 or any other users, who wish to interact with the clusters managed by the network-based cluster hosting service manager 302, which in this example illustration would be clusters 310, 320, 330, and 340. For example, network-based cluster hosting service manager 302 may generate one or more graphical user interfaces (GUIs) for users, which the users may then utilize to select various control functions offered by the control interface for the clusters hosted on the cluster-based hosting service 300.

Figure 5:
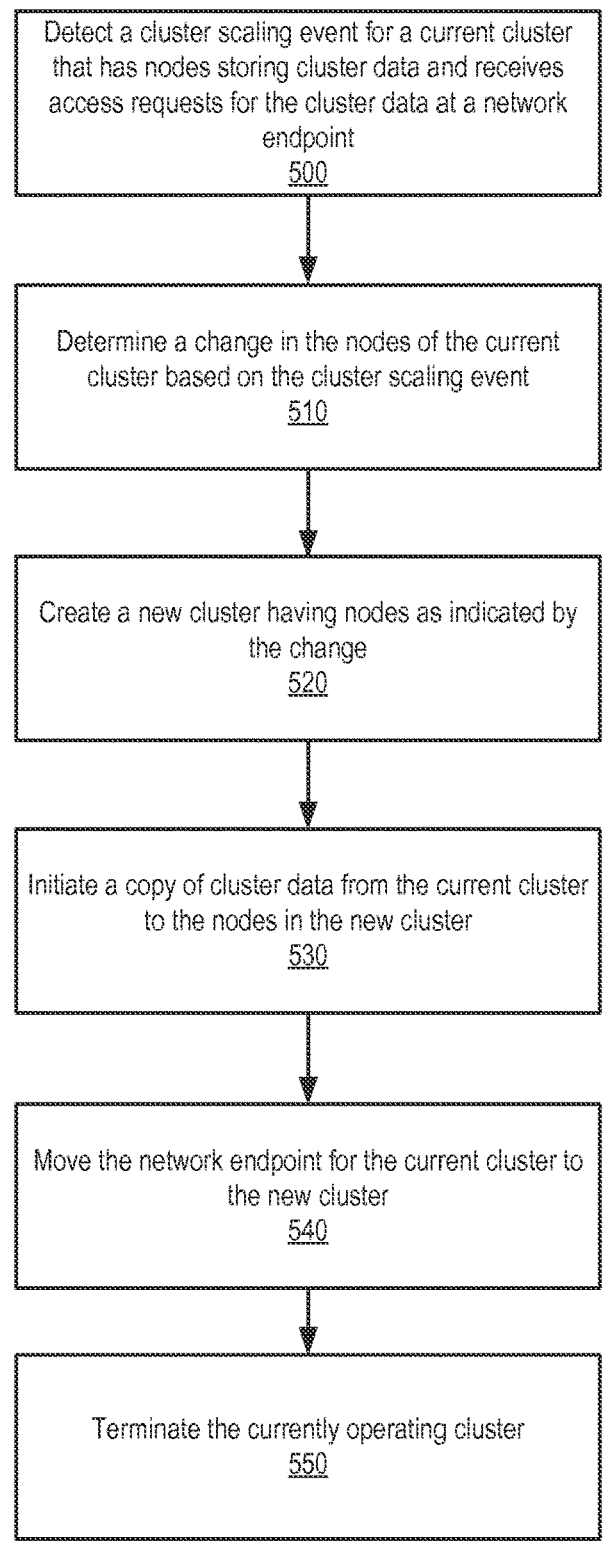
FIG. 5 is a high-level flowchart illustrating a method to scale a computing cluster, according to some embodiments.

Network-based cluster hosting service manager 302 may, in some embodiments, be configured to implement the method of scaling computing clusters discussed below with regard to FIG. 5. Thus, in some embodiments the network-based cluster hosting service manager 302 may detect a cluster scaling event. Network-based cluster hosting service 302 may be configured to poll or query different clusters to detect such an event. A leader node, such as the leader nodes illustrated in FIG. 3, may, in some embodiments, respond to or provide status updates or messages that include performance data and/or other metrics to the network-based cluster hosting service 300. Similarly, if the network-based cluster hosting service manager 302 has initiated a copy of cluster data as part of scaling a current cluster, the network-based cluster hosting service manager 302 may poll either the current cluster or the new cluster, or both to determine the status of the copy operation. In some embodiments, when the network-based cluster hosting service manager 302 detects that the copy operation has been completed, the network-based cluster hosting service manager 302 may move the network endpoint from the current cluster to the new cluster.

Figure 4:
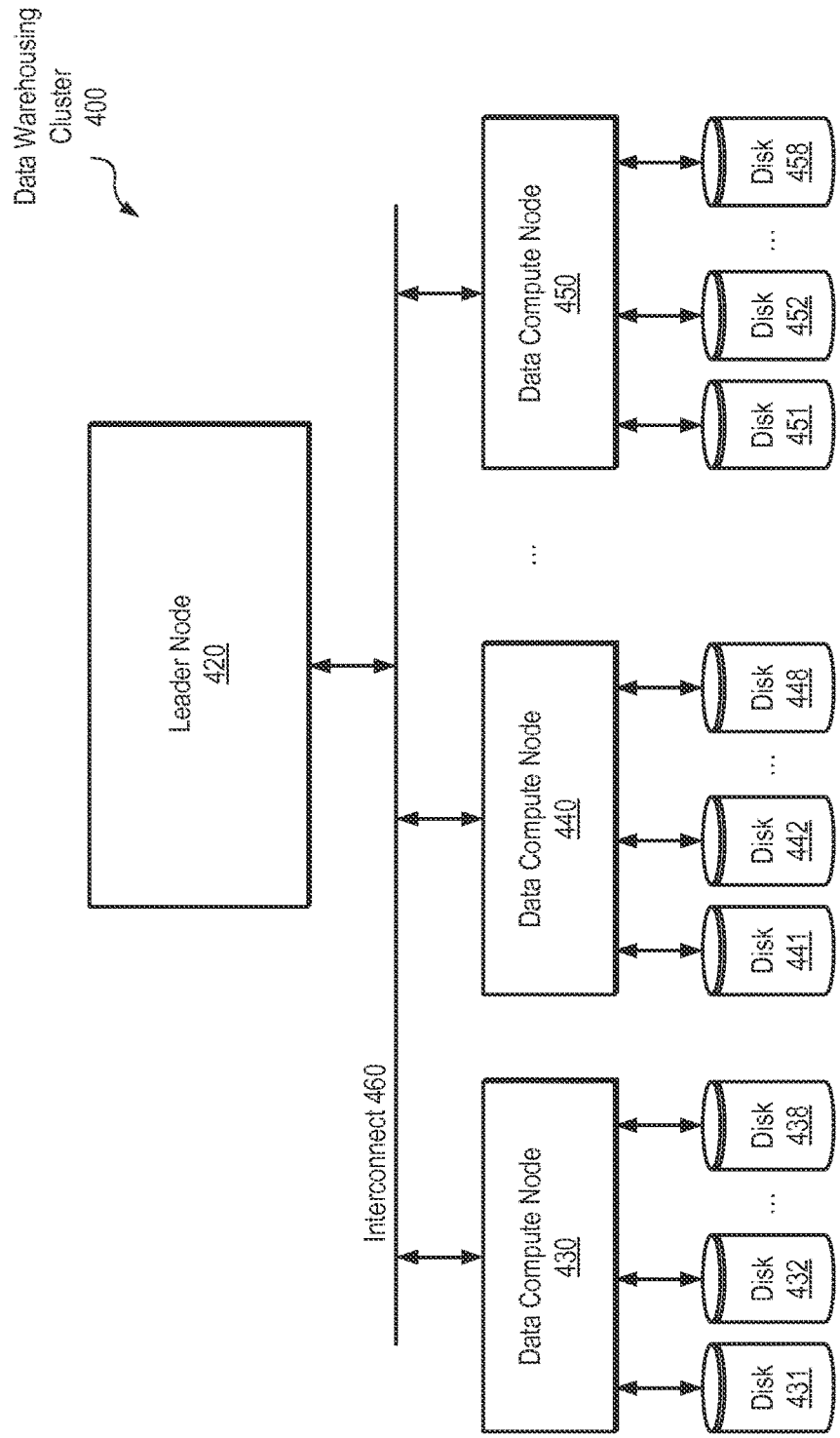
FIG. 4 is a block diagram illustrating an example computing cluster, according to some embodiments.

In some embodiments, network-based cluster hosting service 300 may be configured to host clusters that provide specific computational services. For example, a network-based cluster hosting service 300 may be implemented as part of a web service that allows users to set up, operate, and scale a data warehouse in a cloud computing environment. The computing clusters hosted by the web service may provide an enterprise-class database query and management system that allows users to scale the clusters, such as by sending a cluster scaling request to a cluster control interface implemented by the web-service. Scaling clusters may allow users of the web service to perform their data warehouse functions, such as fast querying capabilities over structured data, integration with various data loading and ETL (extract, transform, and load) tools, client connections with best-in-class business intelligence (BI) reporting, data mining, and analytics tools, and optimizations for very fast execution of complex analytic queries such as those including multi-table joins, sub-queries, and aggregation, more efficiently. FIG. 4 is a block diagram illustrating an example of data warehousing cluster, according to some embodiments.

Data warehousing cluster 400 implemented as part of the web based data warehousing service and includes a leader node 420 and multiple data compute nodes, such as data compute nodes 430, 440, and 450. The leader node 420 may manage communications with users, such as users 312, 322, and 332, as well as all communication with compute nodes instructed to carry out database operations for data stored in the data warehousing cluster 400, such as parsing and developing execution plans to carry out database operations (e.g., the series of steps necessary to obtain results for complex queries and joins) and then communicating the steps, such as in code or other instruction format, to data compute nodes 430, 440, and 450 to carry out the steps needed to perform the database intermediate operations. Leader node 420 may receive results from the data compute nodes 430, 440, and 450. A database schema and/or other metadata information for the cluster data, such as the data tables stored in the cluster, may be managed and stored by leader node 420.

Data warehousing cluster 400 may also include data compute nodes, such as data compute nodes 430, 440, and 450. Data compute nodes may perform processing of database operations, such as queries, based on instructions sent to data base compute nodes 430, 440, and 450 from leader node 420. The instructions may, for example, be compiled code from execution plan segments and steps that are executable by the particular data compute node to which it is sent. Data compute nodes may send intermediate results from queries back to leader node for final aggregation. Each data compute node may be configured to access a certain memory, such as illustrated in FIG. 4. Data compute node 430, for example, may access disk 431, 432, up until disk 438.

Disks, such as the disks illustrated in FIG. 4 may be may be implemented as one or more of any type of storage devices and/or storage system suitable for storing cluster data accessible to the data compute nodes, including, but not limited to: redundant array of inexpensive disks (RAID) devices, disk drives or arrays of disk drives such as Just a Bunch Of Disks (JBOD), (used to refer to disks that are not configured according to RAID), optical storage devices, tape drives, RAM disks, Storage Area Network (SAN), Network Access Storage (NAS), or combinations thereof. Different data storage schemas may be implemented by the data warehouse service on the storage devices, such as column-oriented, row-oriented, or correlation schemes.

The leader node 420 and the various data compute nodes, 430, 440, and 450, may communicate via interconnect 460. Interconnect 460 may provide communication mechanisms similar to those discussed above, such as different types of networks (e.g., private networks), using a variety of different messaging or data formats and protocols (e.g., a custom UDP protocol).

Although FIG. 4 has been described and illustrated in the context of a data warehousing cluster, the various components illustrated and described in FIG. 4 may be easily applied to other computing clusters, whether dedicated to perform a specific function, or to provide more general and/or varied computational services. As such, FIG. 4 is not intended to be limited to a data warehouse cluster, nor a limiting a description of a data warehouse cluster. Similarly, FIGS. 2 and 3 are provided for illustrative purposes as an example of operating environments computing clusters and of network-based cluster hosting services that implement scaling computing clusters in distributed systems. Many different alternative configurations of such systems are also envisioned and thus, FIGS. 2 and 3 are not intended to be limiting as to other possible configurations or implementations of scaling computing clusters in distributed systems.

Workflow of Scaling Computing Clusters

As has been discussed above, computing clusters may include one or more computing nodes that may be configure to perform various computing tasks and services, such as data warehousing. In order to more efficiently perform these tasks and services, computing clusters may be scaled to efficiently allocate computing resources. FIG. 5 is a high-level flowchart illustrating a method to scale a computing cluster, according to some embodiments. Various different systems and devices may implement the various methods and techniques described below. A cluster control interface, for example, such as network-based cluster hosting service manager 302, described above with regard to FIG. 3 may implement the described method. Alternatively, a combination of different systems and devices, such as the leader nodes illustrated in FIGS. 3 and 4 working in combination with a control interface, such as network-based cluster hosting service manager 302, for example may also perform the below method and techniques. Therefore, the above examples and or any other systems or devices referenced as performing the illustrated method, are not intended to be limiting as to other different individuals or configurations of systems and devices.

In some embodiments, a current cluster, such as one of the clusters discussed above with regard to FIGS. 1 through 4, that includes multiple nodes may be operating, storing cluster data in data storage, and responding to access requests received at a network endpoint for the current cluster. A cluster scaling event may then be detected for the current cluster, as indicated at 500. A cluster scaling event may include, but is not limited to, an event triggered by a change in performance metrics or data (e.g., increased number of requests, increased amount of node utilization, etc.), a cluster scaling request (e.g., such as cluster scaling request received at a cluster control interface), or any other user defined parameter or trigger. For example, a user may define various utilization thresholds for a current cluster to trigger a cluster scaling event when exceeded. If the utilization metrics indicated that the cluster utilization has fallen below the user's defined threshold, then a cluster scaling event may be detected. A variety of different triggers may be defined, by multiple different parties. For example, a network-based cluster hosting service manager may also define utilization thresholds, to switch between different types of nodes when thresholds are exceeded. In some embodiments, prior to acting on the detection of a cluster scaling event, user confirmation may be required.

Upon detecting a cluster scaling event, in some embodiments, a change in the nodes of the current cluster may be determined based on the cluster scaling event, as indicated at 510. Continuing with the above example, the user that defined the trigger for a cluster scaling event, may have also defined a change for the current cluster, such as if the utilization metrics indicated that the cluster utilization has fallen below the defined threshold, lower the number of nodes in the current cluster by one. Similar to the many different trigger events that may be defined, many different changes for the nodes in the current cluster may be defined, changing either the number of nodes or the types of nodes, or both, in the current cluster.

In at least some embodiments, a cluster scaling event may be receiving a cluster scaling request that indicates multiple nodes different in number or type from the current cluster, and determining the change in the nodes of the current cluster may be the nodes indicated in the cluster scaling request.

In response to detecting the cluster scaling event, a new cluster may be created that includes the nodes (e.g., the numbers and/or types) indicated by the determined change, as indicated at 530. A new cluster of nodes may, in some embodiments, be created by initializing virtual compute nodes. Alternatively, in another example, the new cluster of nodes may be created by networking together computing devices to create the new cluster.

In at least some embodiments, in response to detecting the cluster scaling event, the current cluster may be set to or directed to operate in read-only mode. In read-only mode, access requests that include write operations on the cluster data may be ignored or returned with an error code or message.

A copy of the cluster data from the current cluster to the nodes in the new cluster may be initiated, as indicated at 530. A cluster control interface, such as the network-based cluster hosting service manager 302 discussed above with regard to FIG. 3, may initiate the copy of cluster data by directing one of the nodes of the new cluster, such as a leader node, to begin performing copy operations to retrieve sets of data from the current cluster. The leader node may, for example, build a list of data to be copied and generate instructions for nodes in the new cluster to retrieve data from the nodes of the current cluster and generate instructions for nodes in the current cluster to send data from the nodes in the current cluster to the new cluster. Alternatively, the leader node, or another node, on the current cluster may be directed to generate the copy operations. These copy operations may be performed by the nodes of the current cluster and the nodes of the new cluster in parallel. The cluster data itself may be sent from the nodes of the current cluster to the nodes in the new cluster using various different communication techniques, mediums, and formats, such as those discussed above with regard to FIGS. 3 and 4, such as in streaming messages or other streaming formats. In addition, while the copy is performed, the current cluster may still respond to read access requests.

Status data on the progress of the transfer of the cluster data may be saved on one or both of the leader nodes, as well as the cluster control interface or other component that initiated the copy operation. This status data may include the current location and state of cluster data (e.g., amount of data already transferred) copied. In the event of a communication error, node failure, or other interruption of the copy operation, the status data may be used to resume or restart the copy operation at a point near the interruption.

In some embodiments, as discussed above, each node may store or have access to one or more data slices for storing cluster data. The copy operation may send cluster data from each data slice in the nodes of the current cluster to one or more data slices in the nodes of the new cluster according to an assignment schema. This assignment schema may ensure a balanced or near even distribution of copying workload among the nodes in the old and the new cluster. In some embodiments, this assignment schema may be implemented based on a hash function technique which may provide a random and/or uniform assignment of data slices. For example, to determine the assignment of data from a data slice a hash function may take as inputs the table name of the data in the data slice plus the number of the current slice location and modifies the output by the number of data slices in the new cluster. In another example of an assignment schema, the nodes may be assigned by a round-robin technique across the compute nodes in the new cluster. By implementing the assignment of data slices from the current cluster to the new cluster, the workload of sending the cluster data may be evenly, or near evenly, distributed across the nodes of the current and new clusters.

Figure 6A:
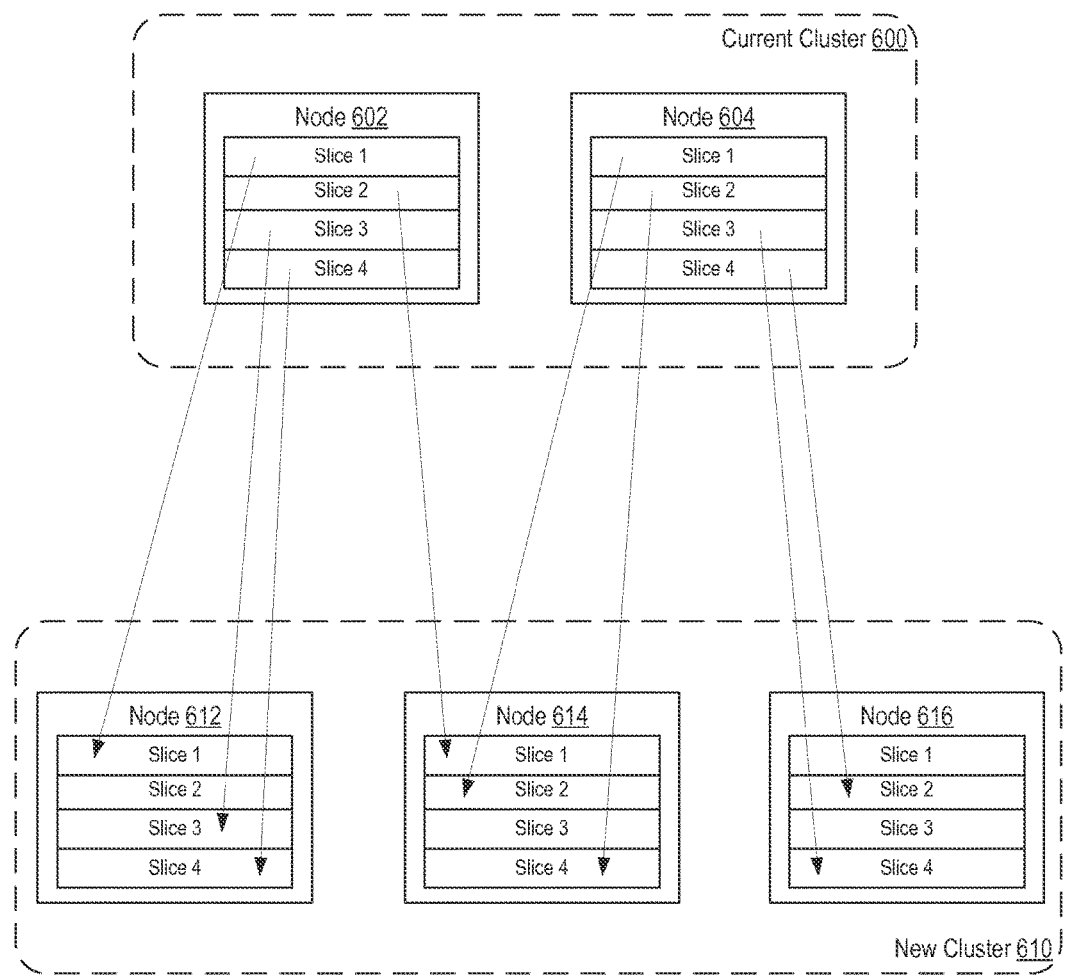
FIGS. 6A through 6C are block diagrams illustrating assigned data slice copy locations between current clusters and new clusters, according to some embodiments.
Figure 6B:
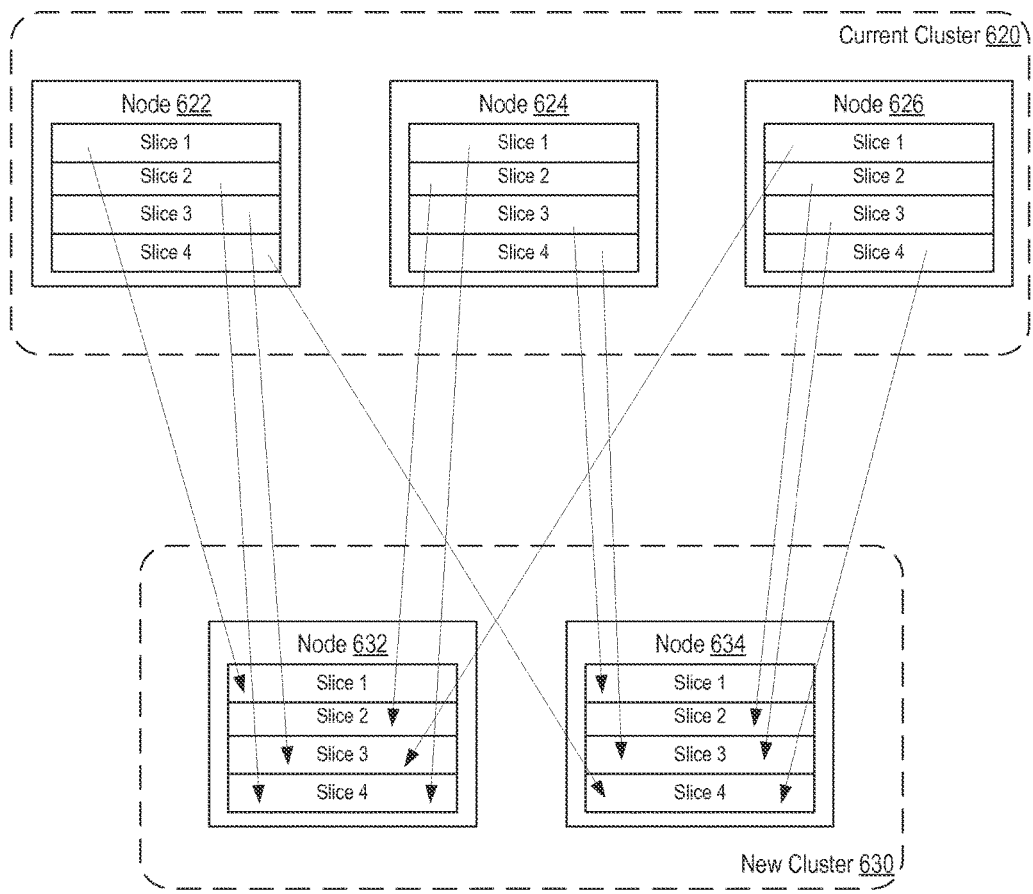
Figure 6C:
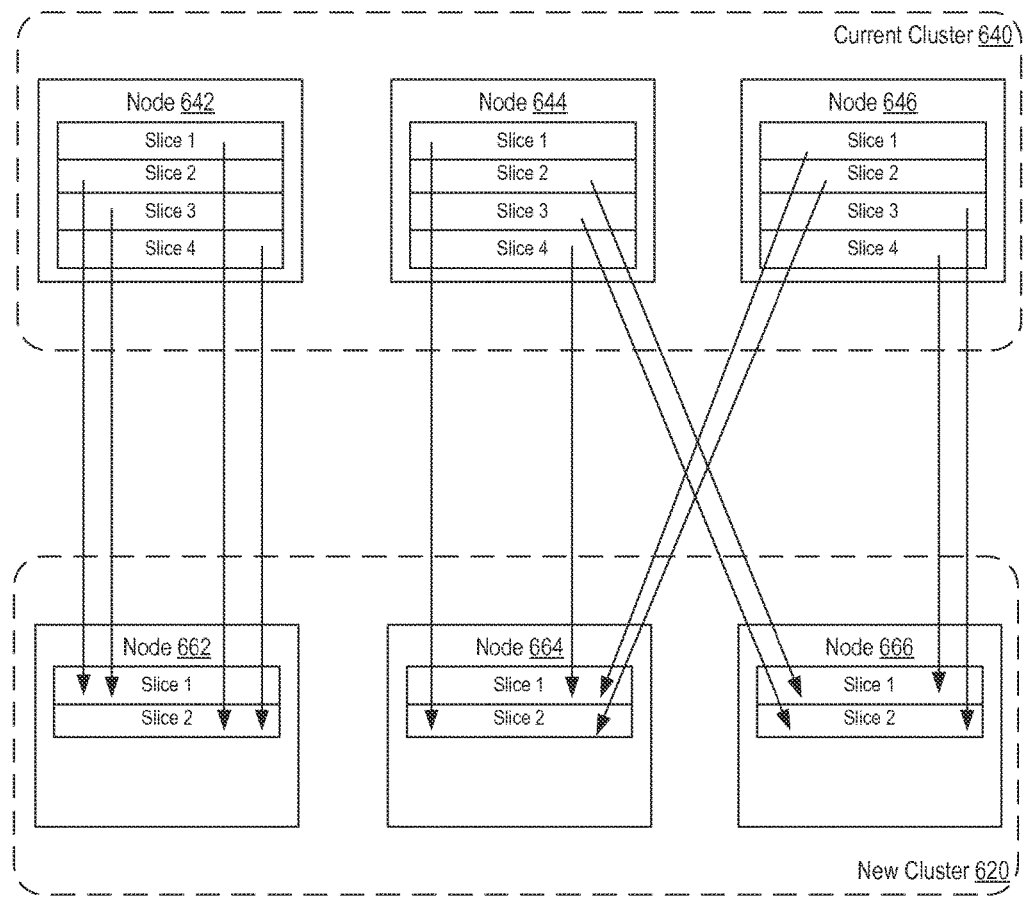

FIGS. 6A through 6C are block diagrams illustrating assigned data slice copy locations between current clusters and new clusters, according to some embodiments. In FIG. 6A, for example, current cluster 600 has two nodes, 602 and 604, each containing four data slices. The change in nodes of the current cluster, such as determined above at element 510, created a new cluster 610 that includes three nodes, 612, 614, and 616. The data from data slices of 602 and 604 are assigned to data slices in the new cluster 610 according to an assignment scheme, such as a using a hashing technique. Slice 1 in node 602, for instance, is assigned to slice 1 in node 612. Slice 2 in 602 is assigned to slice 1 in node

614. Slice 3 in node 602 is assigned to slice 3 in node 612, and slice 4 in node 602 is assigned to slice 4 in node 612. The slices in node 604 are similarly assigned to slices in nodes 614 and 616. Thus, when nodes 602, 604, 612, 614, and 616 are performing the copying operations, the workload may be balanced among the nodes. A balanced workload may, in turn, provide for greater copying efficiency when the nodes perform the copying operations in parallel.

Although not illustrated, data from a data slice, such as slice 1 in node 602 may be ultimately stored on more than one data slice on more than one node, such as on nodes 612, node 614, and node 616. For example, cluster data once copied to a node may be distributed across the nodes in the new cluster according to a distribution scheme (e.g., by performing a hashing technique on a primary or other type of key in a data table). Alternatively, the assignment schema itself may account for a distribution scheme, such as those distribution schemes discussed in further detail below, to be implemented on the new cluster and thus provide data slice assignments that send cluster data to the distributed location in addition to balancing the workload among the nodes performing the copying operations.

FIG. 6B, provides a similar example, except that the change in nodes of the current cluster, such as determined above at element 510, created a new cluster 620 that included one less node, 632, and 634. As in the example illustration discussed above, the data slices in nodes 622, 624, and 626, are assigned to slices in nodes 632 and 634. Note, however, that in some instances two slices may be assigned from the current cluster 620 to a single slice in the new cluster 630. As discussed above, the assignment schema may account for a distribution scheme of the cluster data for the nodes of the new cluster, and, thus for instance, the two slices assigned to slice 4 in node 632 may be assigned to account for a distribution scheme for cluster data. Alternatively, the cluster data may subsequently be distributed across nodes 632 and 634 according to the distribution scheme for cluster data.

FIG. 6C, provides another example, but the change in the nodes of the current cluster, such as determined above at element 510, created a new cluster 650 that included the same number of nodes, three, as the current cluster 640. These nodes, however, are of a different type, in this case different storage capacity. As in the example illustration discussed above, the data slices in nodes 642, 644, and 646, are assigned to slices in nodes 652, 654, and 656. Note, again, that two slices may be assigned from the current node 640 to a single slice in the new node 650.

As discussed above, in some embodiments, cluster data may be distributed in the data slices of the nodes in the current cluster, according to a distribution scheme. For example, a distribution scheme may distribute cluster data across the data slices according to a primary key in the data tables. Alternatively, a distribution scheme may distribute data evenly across the data slices according to an even-distribution scheme. In at least some embodiments, another distribution scheme may simply store data onto a single node without further distributing the data among the other nodes in a cluster. While cluster data is being received at the data slices in the new node, or after all of the cluster data has been received at the data slices in the new node, the new cluster may distribute the data in the data slices on the nodes according to a distribution scheme. In at least some embodiments, the cluster data on the data slices of the nodes of the new cluster may be distributed based on a distribution scheme different from the scheme used to distribute the cluster data on the current cluster. For example, the cluster data on the current cluster may be stored using a distribution scheme that stores data onto a single node, and when copy operations of the cluster data are complete, the new cluster may distribute the cluster data according to an even-distribution scheme.

In some embodiments, the current cluster may contain a set of replicated cluster data in addition to the cluster data stored on the current data cluster. This replicated cluster data may be sent to the nodes of the new cluster along with the cluster data of the current cluster. However, in at least some embodiments the copy of the cluster data is performed without sending the replicated cluster data to the nodes of the new cluster. In response to the completion of the copy operation, the new cluster may replicate the received cluster data across the nodes in the new cluster.

In some embodiments, the network endpoint may be moved from the current cluster to the new cluster, as indicated at 540. From the user's perspective, the network address for the network endpoint remains the same, before and after the endpoint is moved. The network endpoint may be moved by modifying domain name system (DNS) information, such as by modifying a canonical name (CNAME) to point to a different Internet Protocol (IP) address for the new cluster.

In some embodiments, the current cluster may be terminated, as indicated at 550. In at least some embodiments, this termination may be performed in response to the completion of the copy operation, such as indicated at 530, and the completion of the movement of the endpoint, such as indicated at 540.

Example System

Embodiments of scaling computing clusters in a distributed system as described herein may be executed on one or more computer systems, which may interact with various other devices. One such computer system is illustrated by FIG. 7. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for scaling computing clusters in distributed systems as described herein are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

Figure 7:
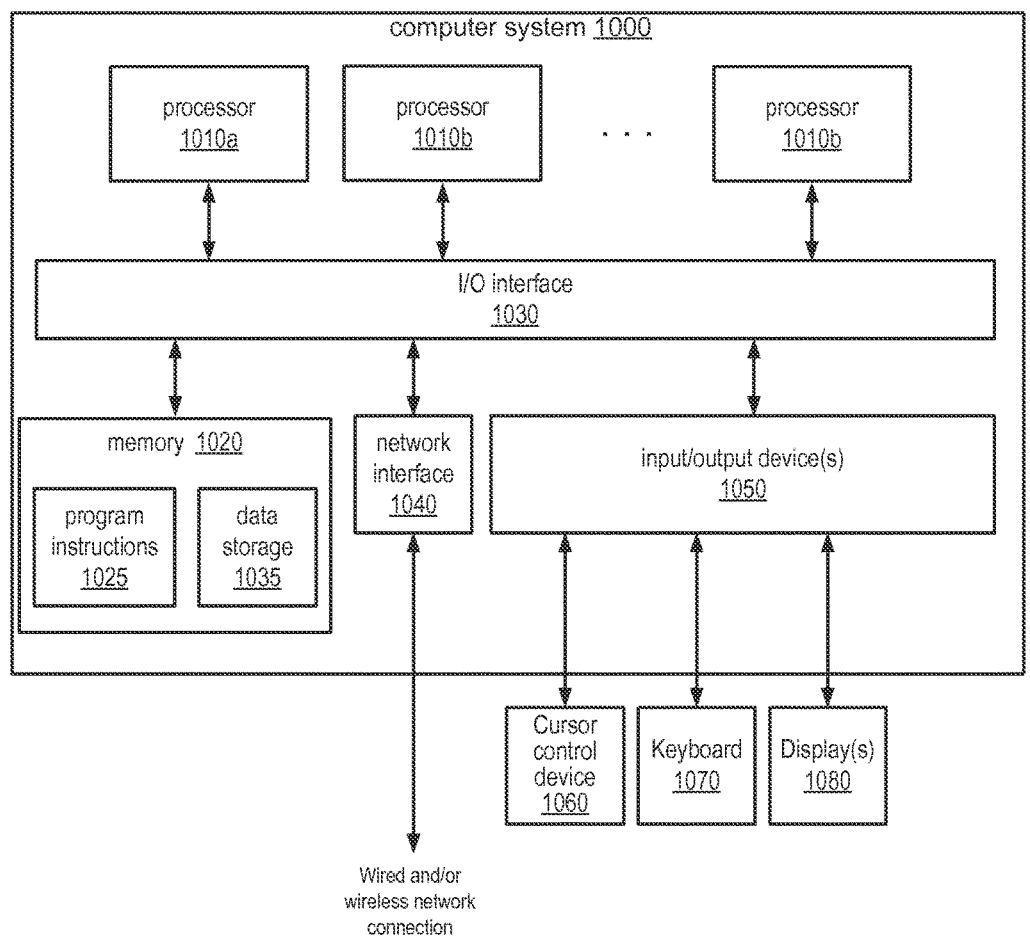
FIG. 7 illustrates an example system, according to some embodiments.

As shown in FIG. 7, memory 1020 may include program instructions 1025, configured to provide time-based item recommendations for a scheduled delivery orders as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the stereo drawing techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   a plurality of computing devices configured to implement:
   a current cluster having a plurality of nodes storing cluster data, wherein each node comprises a respective at least one storage device that stores a respective portion of the cluster data, wherein the current cluster receives access requests for the cluster data at a network endpoint for the current cluster; and
   a cluster control interface configured to:
      receive a cluster scaling request for the current cluster, wherein said cluster scaling request indicates a change in a number or type of the plurality of nodes in the current cluster;
      in response to receiving the cluster scaling request:
         create a new cluster having a plurality of nodes as indicated in the cluster scaling request, wherein the new cluster comprises the change in the number or type of the plurality of nodes from the current cluster; and
         initiate a copy of the cluster data from the plurality of nodes of the current cluster to the plurality of nodes in the new cluster, wherein after completion of the copy of a respective portion of the cluster data from one of the plurality of nodes of the current cluster and before completion of the copy of another respective portion of the cluster data from another one of the plurality of nodes of the current cluster, the current cluster continues to respond to all read requests directed to the network endpoint for the current cluster including a read request directed to the respective portion that has already been copied to the new cluster; and
         subsequent to completion of the copy of the cluster data to the plurality of nodes in the new cluster:
            move the network endpoint for the current cluster to the new cluster, wherein after the network endpoint is moved, access requests directed to the network endpoint are sent to the new cluster; and
            disable the current cluster.

2. The system of claim 1, wherein in response to receiving the cluster scaling request, the cluster control interface is further configured to set the current cluster to operate in read-only mode.

3. The system of claim 1, wherein each node of the current cluster stores one or more data slices of the cluster data, and wherein the copy of the cluster data from the current cluster to the plurality of nodes in the new cluster comprises: for each data slice in the plurality of nodes of the current cluster, assign the data slice to one or more data slices in the plurality of nodes in the new cluster according to an assignment scheme; transfer the cluster data from each data slice in the plurality of nodes of the current cluster to the assigned one or more data slices in the plurality of nodes in the new cluster.

4. The system of claim 1, wherein the plurality of computing devices are part of a larger collection of computing devices implementing a network-based cluster hosting service, and wherein each of the plurality nodes of the current cluster and the plurality of nodes in the new cluster are virtual compute nodes hosted by the network-based cluster hosting service.

5. A method, comprising:
   performing, by a plurality of computing devices:
   detecting a cluster scaling event for a current cluster having a plurality of nodes storing cluster data, wherein each node comprises a respective at least one storage device that stores a respective portion of the cluster data, wherein the current cluster receives access requests for the cluster data at a network endpoint for the current cluster;
   in response to detecting the cluster scaling event:
      determining a change in the number or type of nodes of the current cluster based on the cluster scaling event;
      creating a new cluster having a plurality of nodes as indicated by the change in the number or type of the plurality of nodes of the current cluster;
      initiating a copy of the cluster data from the plurality of nodes of the current cluster to the plurality of nodes in the new cluster, wherein after completion of the copy of a respective portion of the cluster data from one of the plurality of nodes of the current cluster and before completion of the copy of another respective portion of the cluster data from another one of the plurality of nodes of the current cluster, the current cluster continues to respond to all read requests directed to the network endpoint for the current cluster including a read request directed to the respective portion that has already been copied to the new cluster; and moving the network endpoint for the current cluster to the new cluster when the copy of the cluster data to the new cluster is complete, wherein after the network endpoint is moved, access requests directed to the network endpoint are sent to the new cluster.

6. The method of claim 5, wherein the change is to a different number or type of the plurality of nodes in the current cluster.

7. The method of claim 6, wherein the change in type of a node is a different storage capacity for the node or a different computing capacity for the node.

8. The method of claim 5, wherein the plurality of computing devices are part of a larger collection of computing devices implementing a network-based cluster hosting service, wherein at least one or more of the collection of computing devices implement a cluster control interface for the network-based cluster hosting service, and wherein the method further comprises:

performing, by the cluster control interface for the network-based cluster hosting service on the at least one or more computing devices:

wherein said detecting the cluster scaling event for the current cluster having a plurality of nodes storing cluster data comprises receiving a cluster scaling request for the current cluster, wherein said cluster scaling request indicates the plurality of nodes different in number or in type from the current cluster;

wherein said determining a change in the plurality of nodes of the current cluster based on the cluster scaling event comprises determining as the change the plurality of nodes different in number or in type from the current cluster as indicated by the cluster scaling request;

and in response to receiving the cluster scaling request, directing said creating, said initiating, and said moving to be performed.

9. The method of claim 8, further comprising in response to receiving the cluster scaling request, directing, by the control interface, the current cluster to operate in read-only mode.

10. The method of claim 8, wherein each of the plurality of nodes of the current cluster and the plurality of nodes in the new cluster are virtual compute nodes hosted by the network-based cluster hosting service.

11. The method of claim 5, wherein each node comprises one or more data slices for storing cluster data, and wherein the copy comprises sending the cluster data from each data slice in the plurality of nodes of the current cluster to one or more data slices in the plurality of nodes in the new cluster according to an assignment scheme.

12. The method of claim 5, wherein each node comprises one or more data slices for storing cluster data, and wherein the method further comprises distributing the cluster data on the data slices on the plurality of nodes of the new cluster based on a distribution scheme different from another distribution scheme used to distribute the cluster data on the data slices on the plurality of nodes of the current cluster.

13. The method of claim 5, wherein a user sends the access requests before and after the movement of the network endpoint to a same network address.

14. The method of claim 5, further comprising:

wherein the current cluster stores replicated cluster data in addition to the cluster data; wherein said copy of the cluster data from the current cluster to the plurality of nodes in the new cluster is performed without sending the replicated cluster data from the current cluster to the new cluster;

in response to the completion of the copy, replicating the cluster data among the plurality of nodes in the new cluster.

15. The method of claim 5, further comprising in response to the completion of said copy and said moving, terminating the current cluster.

16. A non-transitory, computer-readable storage medium, storing program instructions that when executed by a plurality of computing devices cause the plurality of computing devices to implement:

detecting a cluster scaling event for a current cluster having a plurality of nodes storing cluster data, wherein each node comprises a respective at least one storage device that stores a respective portion of the cluster data, and wherein the current cluster receives access requests for the cluster data at a network endpoint for the current cluster;

in response to detecting the cluster scaling event:

directing the current cluster to operate in read-only mode;

determining a change in the number or type of the plurality of nodes of the current cluster based on the cluster scaling event;

creating a new cluster having a plurality of nodes as indicated by the change in the number or type of the plurality of nodes of the current cluster;

initiating a copy of the cluster data from the plurality of nodes of the current cluster to the plurality of nodes in the new cluster, wherein after completion of the copy of a respective portion of the cluster data from one of the plurality of nodes of the current cluster and before completion of the copy of another respective portion of the cluster data from another one of the plurality of nodes of the current cluster, the current cluster continues to respond to all read requests directed to the network endpoint for the current cluster including a read request directed to the respective portion that is copied to the new cluster; and subsequent to completion of the copy of the cluster data to the plurality of nodes in the new cluster, moving the network endpoint for the current cluster to the new cluster, wherein after the network endpoint is moved, access requests directed to the network endpoint are sent to the new cluster.

17. The non-transitory, computer-readable storage medium of claim 16, wherein the program instructions when executed by the plurality of computing devices further cause the plurality of computing devices to implement in response to the completion of said copy and said moving, terminating the current cluster.

18. The non-transitory, computer-readable storage medium of claim 16, wherein the current cluster and the new cluster are data processing clusters for a distributed data warehouse system.

19. The non-transitory, computer-readable storage medium of claim 18, wherein the cluster data comprises a database schema for the current cluster.

20. The non-transitory, computer-readable storage medium of claim 16, wherein the change is to a node with greater storage capacity than the plurality of nodes of the current cluster.

* * * * *